United States Patent [19]
Tabei et al.

[11] Patent Number: 5,805,216
[45] Date of Patent: Sep. 8, 1998

[54] DEFECTIVE PIXEL CORRECTION CIRCUIT

[75] Inventors: Kenji Tabei; Masato Nishizawa, both of Yokohama, Japan

[73] Assignee: Matsushita Electric Industrial Co., Ltd., Osaka, Japan

[21] Appl. No.: 455,153

[22] Filed: May 31, 1995

[30] Foreign Application Priority Data

Jun. 6, 1994 [JP] Japan ................................ 6-123886

[51] Int. Cl.⁶ ............................................ H04N 9/64
[52] U.S. Cl. .................... 348/246; 348/247; 348/241; 348/250; 348/615; 348/616; 382/308
[58] Field of Search .................... 348/222, 246, 348/247, 245, 250, 252, 607, 241, 615, 616, 617; 382/266, 308, 260, 303, 199, 217, 216, 205, 220; H04N 9/64

[56] References Cited

U.S. PATENT DOCUMENTS

| | | | |
|---|---|---|---|
| 4,517,600 | 5/1985 | Reitmeier | 358/166 |
| 4,541,116 | 9/1985 | Lougheed | 382/49 |
| 4,701,784 | 10/1987 | Matsuoka et al. | 358/213.17 |
| 4,783,840 | 11/1988 | Song | 382/54 |
| 4,817,174 | 3/1989 | Nakatani | 382/22 |
| 4,858,013 | 8/1989 | Matsuda | 358/213.17 |
| 5,144,446 | 9/1992 | Sudo et al. | 358/213.11 |

FOREIGN PATENT DOCUMENTS

| | | |
|---|---|---|
| 0440563 | 8/1991 | European Pat. Off. . |
| 0440563A2 | 8/1991 | European Pat. Off. . |
| 61-208980 | 9/1986 | Japan . |
| 3296374 | 12/1991 | Japan . |
| 2149261 | 6/1985 | United Kingdom . |

*Primary Examiner*—John K. Peng
*Assistant Examiner*—Linus H. Lo
*Attorney, Agent, or Firm*—Stevens, Davis, Miller & Mosher, L.L.P.

[57] ABSTRACT

A defective pixel correction circuit corrects a defective pixel in a solid imaging device such as a CCD exactly and sufficiently. A boundary detection circuit calculates magnitudes of boundaries from signals of eight peripheral pixels taken in a pixel taking-in circuit and a boundary ordering circuit compares the calculated magnitudes of the boundaries with one another to order the magnitudes of the boundaries. An interpolation circuit produces an interpolation signal in accordance with an interpolation method determined by an interpolation method determining circuit on the basis of the order of the ordered boundaries to correct the defective pixel.

6 Claims, 8 Drawing Sheets

FIG.4A
PRIOR ART
FIG.4B
PRIOR ART
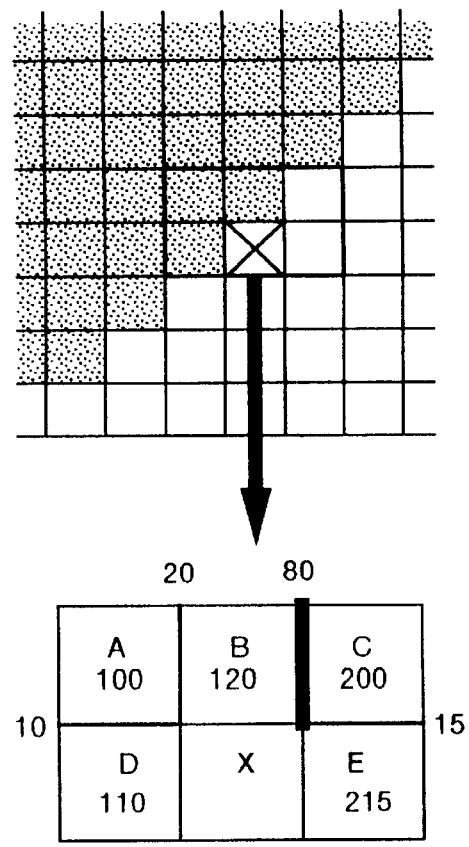
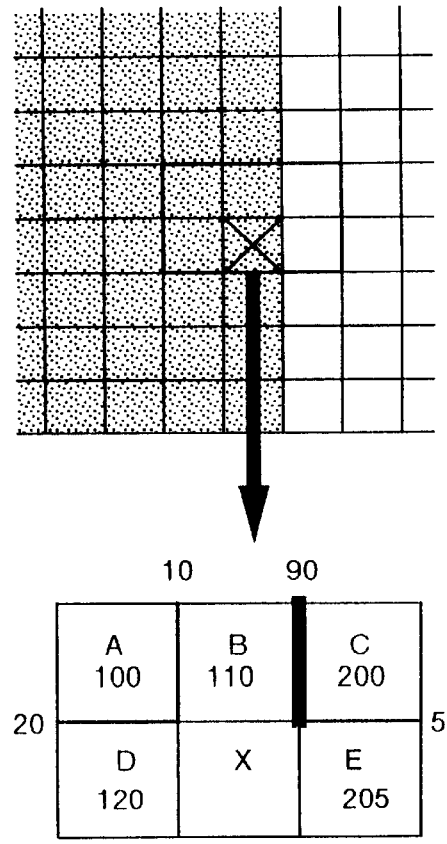

| X00 | X01 | X02 |
|-----|-----|-----|
| X10 | X11 | X12 |
| X20 | X21 | X22 |

INTERPOLATE WITH X10

INTERPOLATE WITH X12

INTERPOLATION METHOD 1
INTERPOLATE WITH X10

INTERPOLATION METHOD 2
INTERPOLATE WITH X12

INTERPOLATION METHOD 3
INTERPOLATE WITH X01

FIG.12D

| X00 | X01 | X02 |
|---|---|---|
| X10 | ↑ | X12 |
| X20 | X21 | X22 |

INTERPOLATION METHOD 4
INTERPOLATE WITH X21

FIG.12E

| X00 | X01 | X02 |
|---|---|---|
| X10 | →←  | X12 |
| X20 | X21 | X22 |

INTERPOLATION METHOD 5
INTERPOLATE WITH
AVERAGE OF X10 AND X12

FIG.12F

| X00 | X01 | X02 |
|---|---|---|
| X10 | ↕ | X12 |
| X20 | X21 | X22 |

INTERPOLATION METHOD 6
INTERPOLATE WITH
AVERAGE OF X01 AND X21

FIG.12G

| X00 | X01 | X02 |
|---|---|---|
| X10 | ↘↖ | X12 |
| X20 | X21 | X22 |

INTERPOLATION METHOD 7
INTERPOLATE WITH
AVERAGE OF X00 AND X22

FIG.12H

| X00 | X01 | X02 |
|---|---|---|
| X10 | ↙↗ | X12 |
| X20 | X21 | X22 |

INTERPOLATION METHOD 8
INTERPOLATE WITH
AVERAGE OF X01 AND X20

FIG.12I

| X00 | X01 | X02 |
|---|---|---|
| X10 | ↘ | X12 |
| X20 | X21 | X22 |

INTERPOLATION METHOD 9
INTERPOLATE WITH X00

FIG.12J

| X00 | X01 | X02 |
|---|---|---|
| X10 | ↙ | X12 |
| X20 | X21 | X22 |

INTERPOLATION METHOD 10
INTERPOLATE WITH X02

FIG.12K

| X00 | X01 | X02 |
|---|---|---|
| X10 | ↖ | X12 |
| X20 | X21 | X22 |

INTERPOLATION METHOD 11
INTERPOLATE WITH X22

FIG.12L

| X00 | X01 | X02 |
|---|---|---|
| X10 | ↗ | X12 |
| X20 | X21 | X22 |

INTERPOLATION METHOD 12
INTERPOLATE WITH X20

DEFECTIVE PIXEL CORRECTION CIRCUIT

BACKGROUND OF THE INVENTION

1. Field of the Invention

The present invention relates to a defective pixel correction circuit for correcting a defective pixel in a solid imaging device such as a CCD.

2. Description of the Prior Art

Correction of a defective pixel in a CCD or the like is heretofore performed by a so-called 0-order hold interpolation method in which positional information of a defective pixel is previously stored and the defective pixel is simply replaced by information obtained from a pixel adjacent to the defective pixel on the basis of the positional information. In this correction method, however, as shown in FIG. 1, when a boundary between light and dark portions of an image is present just before a defective pixel, for example, the place X in which the defective pixel is corrected is conspicuous.

In order to solve such a problem, JP-A-3-296374 proposes a correction method in which levels of image signals produced from a plurality of pixels in the vicinity of a defective pixel are compared with one another to select image information for the pixel used for interpolation on the basis of the comparison result so that image information at the position of the defective pixel is interpolated. The patent publication as mentioned above discloses the following measures.

More particularly, as shown in FIG. 2, absolute values of signal level differences between adjacent pixels (boundaries I, II, III and IV) for five pixels including pixels D and E disposed before and after and adjacent to a defective pixel X and pixels A, B and C disposed before one horizontal line are calculated.

The absolute values of the output signal level differences between the adjacent pixels are compared between the boundaries I and II, I and III, IV and II, and IV and III to produce four kinds of control signals a to d determined in accordance with Table 1 on the basis of the comparison among the four boundaries.

| No. | Bound. I & II | Bound. I & III | Bound. IV & II | Bound. IV & III | Cont. Signal |
|---|---|---|---|---|---|
| 1 | I > II | I > III | IV > II | IV > III | a |
| 2 | I > II | I > III | IV > II | IV < III | a |
| 3 | I > II | I > III | IV < II | IV > III | a |
| 4 | I > II | I > III | IV < II | IV < III | b |
| 5 | I > II | I < III | IV > II | IV > III | a |
| 6 | I > II | I < III | IV > II | IV < III | b |
| 7 | I > II | I < III | IV < II | IV < III | a |
| 8 | I < II | I > III | IV > II | IV > III | a |
| 9 | I < II | I > III | IV < II | IV > III | c |
| 10 | I < II | I > III | IV < II | IV < III | b |
| 11 | I < II | I < III | IV > II | IV > III | c |
| 12 | I < II | I < III | IV > II | IV < III | c |
| 13 | I < II | I < III | IV < II | IV > III | a |
| 14 | I < II | I < III | IV < II | IV < III | d |

As shown in FIGS. 3A and 3B, the control signals a to d correspond to four kinds of stripe patterns including a horizontal pattern shown in FIG. 3A, a right tilted pattern shown in FIG. 3B, a left tilted pattern shown in FIG. 2C and a vertical pattern shown in FIG. 3D. The defective pixel is replaced by an average of the output data of the pixels D and E for the horizontal pattern of FIG. 3A, the output data of the pixel E for the right tilted pattern of FIG. 3B, the output data of the pixel D for the left tilted pattern of FIG. 3C and the output data of the pixel B for the vertical pattern of FIG. 3D to be corrected.

In the correction circuit proposed in the above-mentioned JP-A-3-296374, however, the absolute values of the level differences between the pixels are calculated from the levels of the image signals produced from the five pixels including the right and left pixels of the defective pixel and the three pixels disposed before one line of the defective pixel and are compared with one another to thereby identify a pattern of an object to be imaged in the vicinity of the defective pixel and accordingly the pattern is sometimes identified in error.

For example, in FIG. 4A, when outputs of peripheral pixels are A=100, B=120, C=200, D=110 and E=215, absolute values of boundaries are calculated as follows:

Boundary I=|A−D|=10
Boundary II=|B−A|=20
Boundary III=|C−B|=80
Boundary IV=|E−C|=15

Accordingly, this case corresponds to No. 14 of Table 1 and the control signal d is selected. However, since the pattern of FIG. 4A is tilted right, the pattern must be identified as the right tilted pattern of FIG. 3B and the control signal b must be selected. Further, in FIG. 4B, when outputs of peripheral pixels are A=100, B=110, C=200, D=120 and E=205, absolute values of boundaries are calculated as follows:

Boundary I=|A−D|=20
Boundary II=|B−A|=10
Boundary III=|C−B|=90
Boundary IV=|E−C|=5

Accordingly, this case corresponds to No. 7 of Table 1 and the control signal a is selected. However, since the pattern of FIG. 4B is vertical, the pattern must be identified as the vertical pattern of FIG. 3D and the control signal d must be selected.

As apparent from the above two examples, there is a problem that the correction circuit cannot identify the pattern at the boundary in the vicinity of the defective pixel exactly. Further, since the patterns of an object to be identified are limited to four kinds of patterns including the horizontal, left tilted, right tilted and vertical patterns, sufficient and fine correction is impossible.

SUMMARY OF THE INVENTION

It is an object of the present invention to solve the above problems in the prior art by providing an excellent defective pixel correction circuit capable of correcting a defective pixel exactly even when a complicated boundary is present in an object to be imaged in the vicinity of the defective pixel.

In order to achieve the above object, the defective pixel correction circuit according to the present invention comprises a pixel taking-in circuit for taking in signals produced from pixels in the vicinity of a defective pixel supplied from a digital image, a boundary detection circuit for calculating magnitudes of boundaries between peripheral adjacent pixels from the signals produced from the taken-in pixels, a boundary ordering circuit for comparing the magnitudes of the detected boundaries to order the boundaries, an interpolation method determining circuit for determining an interpolation method on the basis of inputs from the boundary ordering circuit, and an interpolation circuit for producing an interpolation output in accordance with the interpolation method determined by said interpolation method determining circuit.

With the above configuration, according to the present invention, the magnitudes of the boundaries between the peripheral pixels are compared with one another to order the magnitudes of the boundaries so that even when a complicated boundary is present in the vicinity of the defective pixel, the pattern of the boundary can be identified. Further, the interpolation method determining circuit previously determines the optimum interpolation method for each identified pattern so that correction of the defective pixel can be made exactly for each boundary pattern.

BRIEF DESCRIPTION OF THE DRAWINGS

FIGS. 4A and 4B show patterns which cannot be identified in a prior art;

FIGS. 12A to 12L show 12 kinds of interpolation methods.

DESCRIPTION OF THE PREFERRED EMBODIMENTS

Embodiments of the present invention are now described with reference to the accompanying drawings.

Figure 1:
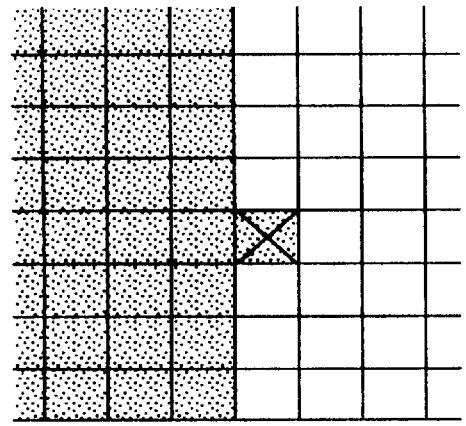
FIG. 1 is a diagram for explaining a conventional correction process using a 0-order hold interpolation.
Figure 2:
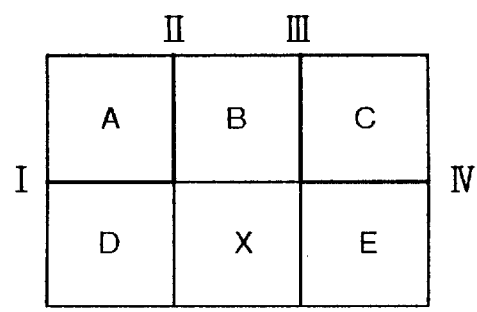
FIG. 2 shows a pixel arrangement in the vicinity of a defective pixel in a prior art.
Figure 3A:
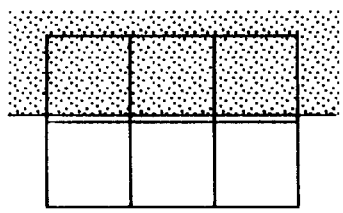
FIGS. 3A to 3D show stripe patterns identified in a prior art.
Figure 3B:
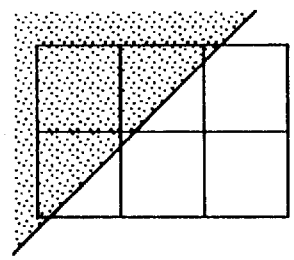
Figure 3C:
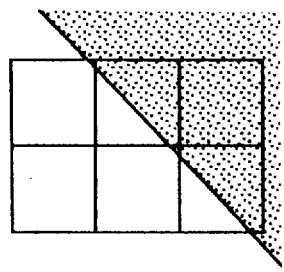
Figure 3D:
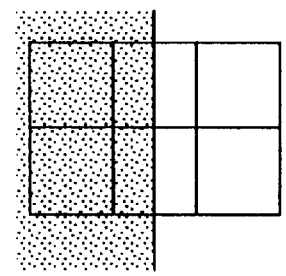
Figures 5, 6:
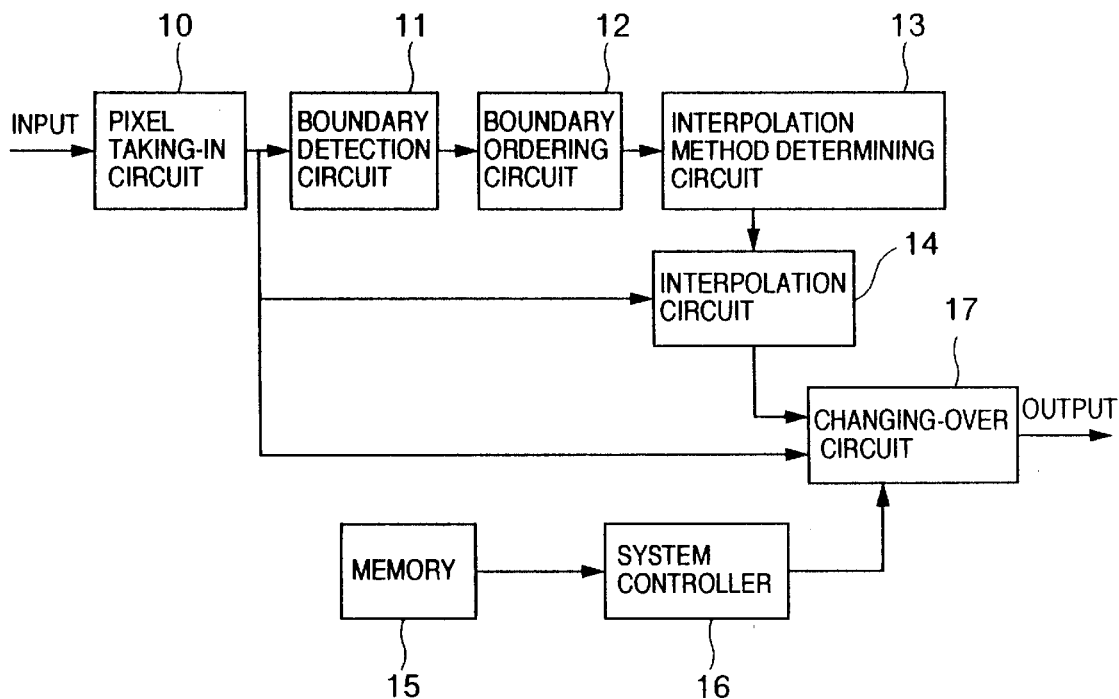
FIG. 5 is a block diagram schematically illustrating an embodiment of a defective pixel correction circuit of the present invention.
FIG. 6 shows a window of pixels taken in by a pixel taking-in circuit.

FIG. 5 is a block diagram schematically illustrating an embodiment of the present invention. Numeral 10 denotes a pixel taking-in circuit for taking in signals of nine pixels corresponding to a window of 3×3 supplied from a digital imaging device such as a CCD, numeral 11 denotes a boundary detection circuit for calculating magnitudes of boundaries between adjacent pixels on the basis of eight peripheral or surrounding pixels taken in by the pixel taking-in circuit 10, numeral 12 denotes a boundary ordering circuit for ordering the boundaries on the basis of the magnitudes of the boundaries calculated by the boundary detection circuit 11, numeral 13 denotes an interpolation method determining circuit for determining an interpolation method on the basis of an output of the boundary ordering circuit 12, and numeral 14 denotes an interpolation circuit for performing interpolation using signals from the eight surrounding pixels taken in by the pixel taking-in circuit 10 in accordance with the interpolation method determined by the interpolation method determining circuit 13.

Numeral 15 denotes a memory for storing a position of a defective pixel, numeral 16 denotes a system controller for judging whether the position of the center pixel taken in by the pixel taking-in circuit 10 is stored in the memory 15 or not to control a change-over circuit 17, and numeral 17 denotes the changing-over circuit for selecting between a signal of the center pixel taken in by the pixel taking-in circuit 10 and an interpolation output from the interpolation circuit 14 in accordance with a control signal from the system controller 16.

Operation of the embodiment is now described.

Figure 7:
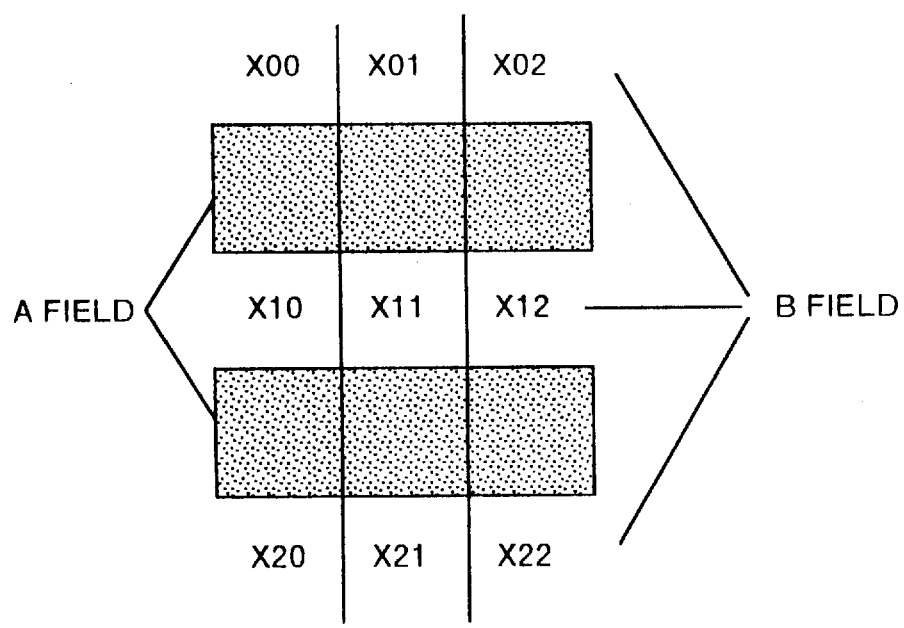
FIG. 7 shows a window of pixels taken in a pixel taking-in circuit in a frame image in the interlaced scanning system.

A method of taking in an image is first described. The pixel taking-in circuit 10 takes in the signals of nine pixels corresponding to the window of 3×3 and produces the signals. That is, as shown in FIG. 6, the pixel taking-in circuit 10 produces a signal x11 from X11 corresponding to the center pixel and signals x00 to x02, x10, x12 and x20 to x22 from X00 to X02, X10, X12 and X20 to X22 corresponding to the surrounding or peripheral pixels, respectively. However, in the case of an interlaced signal in the interlaced scanning method, interpolation is made in a field and accordingly the nine pixels correspond to a window of 3×3 in the field. In other words, in the case of the interlaced scanning, the pixel taking-in circuit takes in signals from pixels disposed before two lines and after two lines in a frame picture as shown in FIG. 7.

Figure 8:
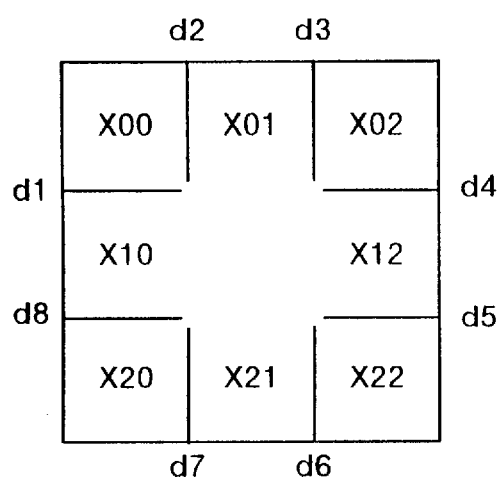
FIG. 8 shows positions of boundaries.

A method of calculating magnitudes of the boundaries between the surrounding pixels is now described. The boundary detection circuit 11 calculates absolute values of differences between the signals from adjacent pixels of the eight surrounding pixels taken in by the pixel taking-in circuit 10 as shown in FIG. 8. However, the magnitudes of the boundaries between the vertically adjacent pixels are multiplied by a coefficient k. That is, the magnitudes d1 to d8 of the boundaries are calculated by the following equation 1:

Equation 1:

$$d1 = k \cdot |x10 - x00|$$

$$d2 = |x00 - x01|$$

$$d3 = |x01 - x02|$$

$$d4 = k \cdot |x02 - x12|$$

$$d5 = k \cdot |x12 - x22|$$

$$d6 = |x22 - x21|$$

$$d7 = |x21 - x20|$$

$$d8 = k \cdot |x20 - x10|$$

where the coefficient k is a positive real number which is used to correct the strength of the correlation between pixels in the horizontal and vertical directions caused by different distances between pixels for calculation of a signal difference in the horizontal and vertical direction due to the aspect ratio of the image and the interlaced scanning.

A method of comparing the boundaries in magnitude is now described. The boundary ordering circuit 12 compares the magnitudes d1 to d8 of the boundaries with one another with respect to all combinations of 56 sets including d1 and d2, d1 and d3, ..., d7 and d8 and produces the order of the boundary magnitude d1 as D1, the order of d2 as D2, and the orders of the boundary magnitude d3 to d8 as D3 to D8, respectively. A combination of D1 to D8 is named a boundary order pattern. Further, when the comparison results are equal to each other, the relation in magnitude is determined in accordance with the following rules:

Rule 1: when the comparison results in magnitude of the boundaries in the vertical and horizontal directions are equal, it is assumed that the magnitude of the boundary having smaller one of the correlation between the horizontally adjacent pixels and the correlation between the vertically adjacent pixels is larger than that of the other. Further, in the interlaced scanning system, since the correlation between the horizontally adjacent pixels is generally higher than the correlation between the vertically adjacent pixels, the boundary in the vertical direction is assumed to be larger in magnitude when the comparison results in magnitude of the boundaries in the vertical and horizontal directions are equal.

Rule 2: when the comparison results in magnitude of the boundaries in the same direction are equal, various rules can be considered since the positional relation is symmetrical, while the boundary having a smaller suffix is assumed to be larger than the boundary having a larger suffix in the embodiment.

The rules 1 and 2 are combined to form the relation of the following equation 2 and accordingly when the comparison results are equal, the boundaries are ordered in accordance with the equation 2:

Equation 2:

$$d1>d4>d5>d8>d2>d3>d6>d7$$

The above operation is now described with reference to a definite example. When the relation of d1 to d8 is defined by the following equation 3, the boundary order pattern is calculated.

Equation 3:

$$d3>d5>d1>d6>d8>d2=d7>d4$$

That is, d1 is in a third place and accordingly the order D1 of d1 is three. Further, d2 and d7 are both in the sixth place, while since it is judged that d2 is larger than d7 (d2>d7) in accordance with the above rule, d2 is in the sixth place and d7 is the seventh place. Accordingly, D1 to D8 are determined to be the following equation 4:

Equation 4:

$$D1=3, D2=6, D3=1, D4=8, D5=2, D6=4, D7=7, D8=5$$

A method of determining an interpolation method from the comparison results is now described. The boundary order pattern produced by the boundary ordering circuit 12 represents a combined order of the magnitudes of the eight boundaries and accordingly there are eight factorial, that is, 8!=40320 kinds of patterns. The interpolation method determining circuit 13 assigns a peculiar number to each of the boundary order patterns produced by the boundary ordering circuit 12. This number is named the boundary order pattern number. The boundary order pattern number is calculated from the boundary order pattern D1 to D8 produced by the boundary ordering circuit 12 in accordance with the following equation 5.

Equation 5:

$$PN=D1+8(D2+8(D3+8(D4+8(D5+8(D6+8(D7+8 \cdot D8))))))$$

Since D1 to D8 do not have the same value, the pattern number PN does not have a continuous number.

In order to determine the interpolation method for the boundary order pattern classified above, the interpolation method determining method 13 uniquely sets the interpolation method to be outputted for each of the patterns previously. The relation of the order of the boundary magnitude in the comparison result and the interpolation method is now described definitely.

Figure 9:
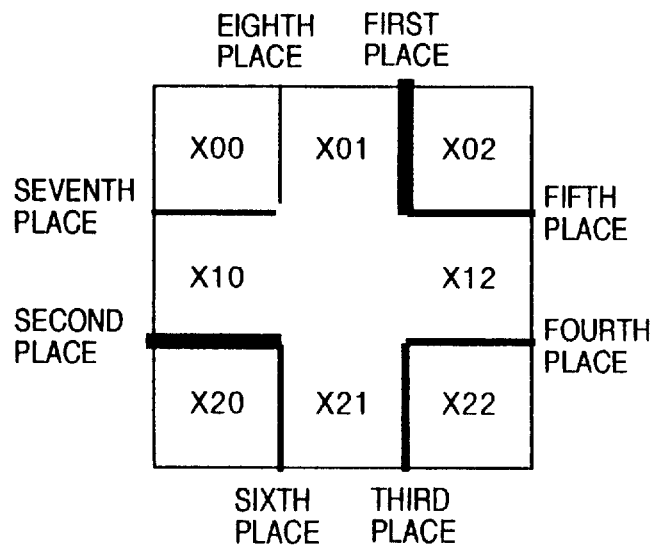
FIG. 9 shows an actual example of detected boundaries.
Figure 10A:
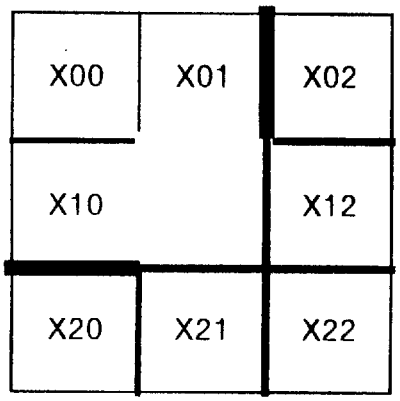
FIGS. 10A and 10B show examples of actual boundaries presumed from detected boundaries.
Figure 10B:
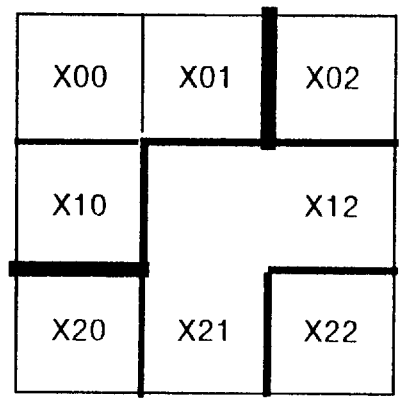

When it is assumed that the boundary order pattern D1 to D8 produced by the boundary ordering circuit 12 is set as indicated by the following equation 6 and the order of the boundary magnitude is set as shown in FIG. 9, boundaries of an actual peripheral image as shown in FIGS. 10A and 10B are considered as boundaries of the actual peripheral image to be presumed from the boundaries shown in FIG. 9.

Equation 6:

$$D1=7, D2=8, D3=1, D4=5, D5=4, D6=3, D7=6, D8=2$$

Thus, when the patterns of the peripheral image are different, optimum interpolation methods therefor are also different. The interpolation method of FIG. 11A is considered to be optimum for the pattern of the peripheral image of FIG. 10A and the interpolation method of FIG. 11B is considered to be optimum for the pattern of FIG. 10B.

Figure 11A:
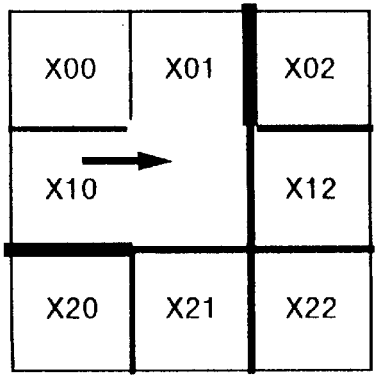
FIGS. 11A and 11B show examples of interpolation methods suitable for boundary patterns.
Figure 11B:
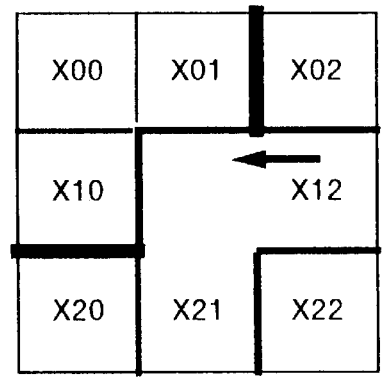
Figure 12A:
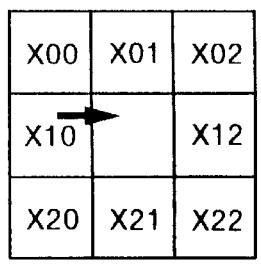
Figure 12B:
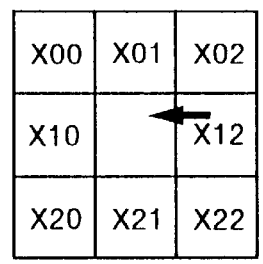
Figure 12C:
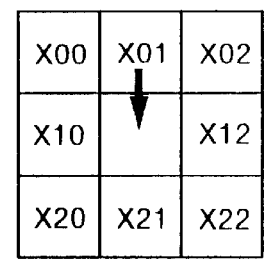

However, when the boundary order pattern as shown in FIG. 9 is obtained by the boundary ordering circuit 12, it is difficult to uniquely determine the optimum interpolation method from a large number of candidates for the interpolation methods including those as shown in FIGS. 11A and 11B. Accordingly, a simulation is previously made in accordance with the following method to determine an optimum interpolation method for each of the boundary order patterns.

The simulation uses a digital image having no defective pixel.

First of all, nine pixels corresponding to a window of 3×3 having a center of coordinates (x,y) are taken in from the image. In order to specify the process for the window of 3×3 having the center of coordinates (x,y), a value of the center pixel is attached with a suffix of (x,y) such as x11(x,y). Further, in the case of the interlaced scanning system, pixels of the window of 3×3 for a field image are taken in the same manner as in the pixel taking-in circuit 10.

The nine pixels taken in by the circuit 10 are processed by the boundary detection circuit 11 and the boundary ordering circuit 12 as described above so that the boundary order patterns D1(x,y) to D8(x,y) are calculated and the boundary order pattern number PN(x,y) is calculated in accordance with the equation 5.

Interpolation outputs interpolated by 12 kinds of interpolation methods shown in FIGS. 12A to 12L are calculated from the eight surrounding pixels taken in by the circuit 10 so that an interpolation output calculated by an interpolation method 1 is assumed to be y1(x,y), an interpolation output by an interpolation method 2 is assumed to y2(x,y) and interpolation outputs by interpolation methods 3 to 12 are assumed to y3(x,y) to y12(x,y), respectively. FIGS. 12A to 12L show the 12 kinds of simple interpolation methods, while other interpolation methods using an average or a weighted average of a plurality of pixels may be considered. Generally, an interpolation output yn can be expressed by the following equation 7:

Equation 7:

$$yn=\alpha 1 \cdot x00+\alpha 2 \cdot x01+\alpha 3 \cdot x02+\alpha 4 \cdot x12+\alpha 5 \cdot x22+\alpha 6 \cdot x21+\alpha 7 \cdot x20+\alpha 8 \cdot x10$$

where α1 to α8 represent coefficients of actual numbers.

On the other hand, in this simulation, pixels are taken in from an image having no defective pixel and accordingly a signal x11(x,y) produced by a center pixel X11(x,y) in the window of 3×3 can be considered to be a target value for correction of the defective pixel. Thus, interpolation errors of the respective interpolation methods can be calculated. An interpolation error ERRi(x,y) of an interpolation method i is given by the following equation 8:

Equation 8:

$$ERRi(x,y)=|yi(X,Y)-x11(x,y)|$$

where i=1, 2, ..., 12

The interpolation error ERRi(x,y) is calculated for the whole image and a squared average of the error is calculated for each boundary pattern number. That is, when an interpolation method i is adopted in the boundary order pattern number j, a squared average TOTALERR(i,j) of the interpolation error is given by the following equation 9:

Equation 9:

$$TOTALERR(i,j) = \Sigma Hj(x,y) \cdot ERRi(x,y) \cdot ERRi(x,y) \quad (x,y) \in \text{all pixels}$$

where $Hj(x,y)=1$: (for $j=PN(x,y)$)
$Hj(x,y)=0$: (for $j \neq PN(x,y)$)

By selecting the interpolation method having the minimum squared average of the squared averages TOTALERR(1,j), TOTALERR(2,j), ..., TOTALERR(12,j) of the interpolation errors by the 12 kinds of interpolation methods, the optimum interpolation method can be determined uniquely for the boundary order pattern number j. The above operation is made for all of the boundary order pattern numbers.

Even when it is difficult to uniquely determine the interpolation method suitable for the boundary pattern obtained from only the surrounding pixels by means of intuitive judgement, the simulation can be performed for image data having various conditions to thereby determine the interpolation method suitable for each boundary pattern.

The interpolation method is now described. The interpolation circuit 14 performs calculation for signals produced from the eight surrounding pixels in accordance with the 12 kinds of interpolation methods (equation 10 described later) shown in FIGS. 12A to 12L to produce interpolation signals y1 to y12. An interpolation signal of the interpolation method determined by the interpolation method determining circuit 13 is selected from the above 12 kinds of interpolation signals and is produced. The interpolation method expressed by the equation 7 can be added as the interpolation method to be selected except the 12 kinds of interpolation methods shown in FIGS. 12A to 12L.

Equation 10:
Interpolation Method 1: y1=x10
Interpolation Method 2: y2=x12
Interpolation Method 3: y3=x01
Interpolation Method 4: y4=x21
Interpolation Method 5: y5=(x10+x12)/2
Interpolation Method 6: y6=(x01+x21)/2
Interpolation Method 7: y7=(x00+x22)/2
Interpolation Method 8: y8=(x02+x20)/2
Interpolation Method 9: y9=x00
Interpolation Method 10: y10=x02
Interpolation Method 11: y11=x22
Interpolation Method 12: y12=x20

Finally, the memory 15, the system controller 16 and the changing-over circuit 17 are described.

The memory 15 stores data indicative of positions of a plurality of defective pixels contained in a solid imaging device such as a CCD. The system controller 16 reads out the position data of the defective pixels from the memory 15 and controls the changing-over circuit 17 to produce the interpolation output when the position of the center pixel of the window of 3×3 taken in by the pixel taking-in circuit 10 is coincident with the position of the defective pixel stored in the memory 15 and to produce the center pixel x11 when not coincident.

As described above, according to the defective pixel correction circuit of the present invention, the magnitudes of the boundaries between the peripheral or surrounding pixels are ordered to thereby identify the boundary pattern in the vicinity of the defective pixel so that the interpolation method suitable for the pattern is selected to perform interpolation. Accordingly, even when the complicated boundary is present in the vicinity of the defective pixel, the boundary can be identified to correct the defective pixel finely and exactly.

We claim:

1. A defective pixel correction circuit comprising:

a pixel taking-in circuit for taking in signals produced from peripheral pixels of a defective pixel in an imaging device;

a boundary detection circuit for detecting magnitudes of boundaries between adjacent pixels of the taken-in peripheral pixels;

a boundary ordering circuit using outputs of said boundary detection circuit for ordering the boundaries;

an interpolation method determining circuit for determining an interpolation method on the basis of outputs of said boundary ordering circuit, and an interpolation circuit for producing an interpolation signal by said determined interpolation method, wherein said boundary detection circuit calculates the magnitudes of the boundaries between the adjacent pixels from eight peripheral pixels in said pixel taking-in circuit and said boundary ordering circuit effects a determination on the basis of the magnitudes of the boundaries between the pixels, and wherein said boundary ordering circuit includes a rule for judging that the magnitude of the boundary in the vertical direction is larger than that in the horizontal direction when the magnitudes of the boundaries in the vertical and horizontal directions are equal to each other.

2. A defective pixel correction circuit comprising:

a pixel taking-in circuit for taking in signals produced from peripheral pixels of a defective pixel in an imaging device;

a boundary detection circuit for detecting magnitudes of boundaries between adjacent pixels of the taken-in peripheral pixels;

a boundary ordering circuit using outputs of said boundary detection circuit for ordering the boundaries;

an interpolation method determining circuit for determining an interpolation method on the basis of outputs of said boundary ordering circuit;

an interpolation circuit for producing an interpolation signal by said determined interpolation method;

a memory for storing a position of said defective pixel; and replacement control means for judging whether said position of said defective pixel is stored in said memory or not and replacing a value of said center pixel of said pixel taking-in circuit with a value based on said interpolation output signal of said interpolation circuit when data is stored in said memory, wherein said boundary detection circuit is to calculate the magnitudes of the boundaries between the adjacent pixels from eight peripheral pixels in said pixel taking-in circuit and said boundary ordering circuit is to effect determination on the basis of the magnitudes of the boundaries between the pixels, and wherein said boundary ordering circuit includes a rule for judging that the magnitude of the boundary in the vertical direction is larger than that in the horizontal direction when the magnitudes of the boundaries in the vertical and horizontal directions are equal to each other.

3. A defective pixel correction circuit comprising:
a pixel taking-in circuit for taking in signals produced from peripheral pixels of a defective pixel in an imaging device;
a boundary detection circuit for detecting magnitudes of boundaries between adjacent pixels of the taken-in peripheral pixels;
a boundary ordering circuit using outputs of said boundary detection circuit for ordering the boundaries;
an interpolation method determining circuit for determining an interpolation method on the basis of outputs of said boundary ordering circuit, and
an interpolation circuit for producing an interpolation signal by said determined interpolation method,
wherein said boundary detection circuit calculates the magnitudes of the boundaries between the adjacent pixels from eight peripheral pixels in said pixel taking-in circuit and said boundary ordering circuit effects a determination on the basis of the magnitudes of the boundaries between the pixels, and wherein said boundary ordering circuit includes a rule for judging that the magnitude of the boundary having a smaller suffix is larger than that having a larger suffix when the magnitudes of the boundaries in the vertical direction or the horizontal direction are equal to each other.

4. A defective pixel correction circuit comprising:
a pixel taking-in circuit for taking in signals produced from peripheral pixels of a defective pixel in an imaging device;
a boundary detection circuit for detecting magnitudes of boundaries between adjacent pixels of the taken-in peripheral pixels;
a boundary ordering circuit using outputs of said boundary detection circuit for ordering the boundaries;
an interpolation method determining circuit for determining an interpolation method on the basis of outputs of said boundary ordering circuit;
an interpolation circuit for producing an interpolation signal by said determined interpolation method;
a memory for storing a position of said defective pixel; and
replacement control means for judging whether said position of said defective pixel is stored in said memory or not and replacing a value of said center pixel of said pixel taking-in circuit with a value based on said interpolation output signal of said interpolation circuit when data is stored in said memory, wherein said boundary detection circuit is to calculate the magnitudes of the boundaries between the adjacent pixels from eight peripheral pixels in said pixel taking-in circuit and said boundary ordering circuit is to effect determination on the basis of the magnitudes of the boundaries between the pixels, and wherein said boundary ordering circuit includes a rule for judging that the magnitude of the boundary having a smaller suffix is larger than that having a larger suffix when the magnitudes of the boundaries in the vertical direction or the horizontal direction are equal to each other.

5. A defective pixel correction circuit comprising:
a pixel taking-in circuit for taking in signals produced from peripheral pixels of a defective pixel in an imaging device;
a boundary detection circuit for detecting magnitudes of boundaries between adjacent pixels of the taken-in peripheral pixels;
a boundary ordering circuit using outputs of said boundary detection circuit for ordering the boundaries;
an interpolation method determining circuit for determining an interpolation method on the basis of outputs of said boundary ordering circuit, and
an interpolation circuit for producing an interpolation signal by said determined interpolation method,
wherein said boundary detection circuit calculates the magnitudes of the boundaries between the adjacent pixels from eight peripheral pixels in said pixel taking-in circuit and said boundary ordering circuit effects a determination on the basis of the magnitudes of the boundaries between the pixels, and wherein said boundary ordering circuit includes a rule for judging that the magnitude of the boundary in the vertical direction is larger than that in the horizontal direction when the magnitude of the boundary in the vertical direction is equal to that in the horizontal direction and judging that the magnitude of the boundary having a smaller suffix is larger than that having a larger suffix when the magnitudes of the boundaries in the vertical direction or the horizontal direction are equal to each other.

6. A defective pixel correction circuit comprising:
a pixel taking-in circuit for taking in signals produced from peripheral pixels of a defective pixel in an imaging device;
a boundary detection circuit for detecting magnitudes of boundaries between adjacent pixels of the taken-in peripheral pixels;
a boundary ordering circuit using outputs of said boundary detection circuit for ordering the boundaries;
an interpolation method determining circuit for determining an interpolation method on the basis of outputs of said boundary ordering circuit;
an interpolation circuit for producing an interpolation signal by said determined interpolation method;
a memory for storing a position of said defective pixel; and
replacement control means for judging whether said position of said defective pixel is stored in said memory or not and replacing a value of said center pixel of said pixel taking-in circuit with a value based on said interpolation output signal of said interpolation circuit when data is stored in said memory, wherein said boundary detection circuit is to calculate the magnitudes of the boundaries between the adjacent pixels from eight peripheral pixels in said pixel taking-in circuit and said boundary ordering circuit is to effect determination on the basis of the magnitudes of the boundaries between the pixels, and wherein said boundary ordering circuit includes a rule for judging that the magnitude of the boundary in the vertical direction is larger than that in the horizontal direction when the magnitude of the boundary in the vertical direction is equal to that in the horizontal direction and judging that the magnitude of the boundary having a smaller suffix is larger than that having a larger suffix when the magnitudes of the boundaries in the vertical direction or the horizontal direction are equal to each other.

* * * * *